Figure 1:
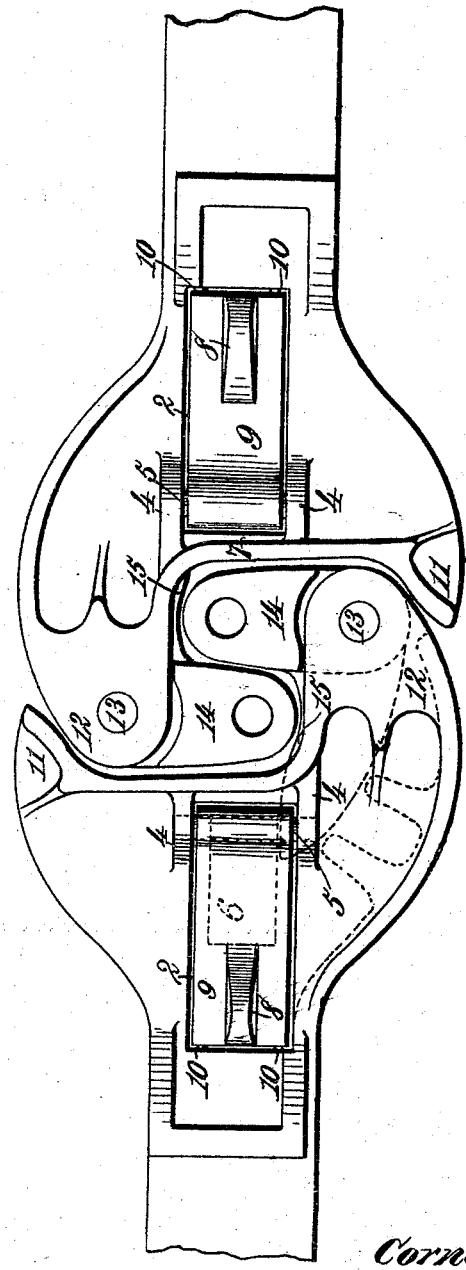

(No Model.)  2 Sheets—Sheet 1.

C. HALPIN.
CAR COUPLING.

No. 500,890.  Patented July 4, 1893.

Witnesses.
Robert Emmett,
G. W. Rea.

Inventor
Cornelius Halpin.
By
James L. Norris.
Atty.

(No Model.) 2 Sheets—Sheet 2.
C. HALPIN.
CAR COUPLING.
No. 500,890. Patented July 4, 1893.
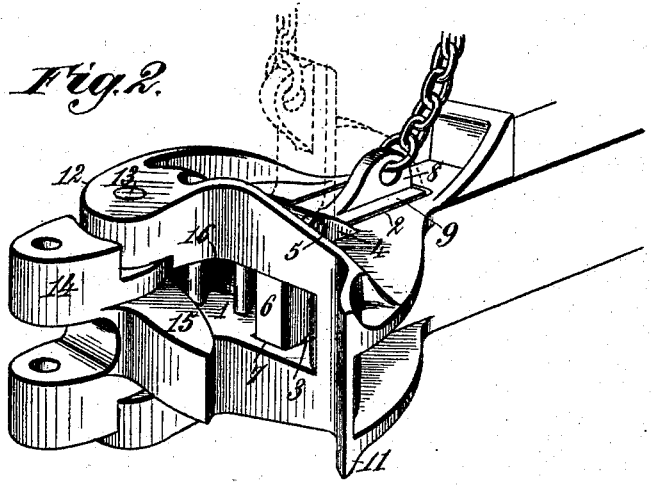
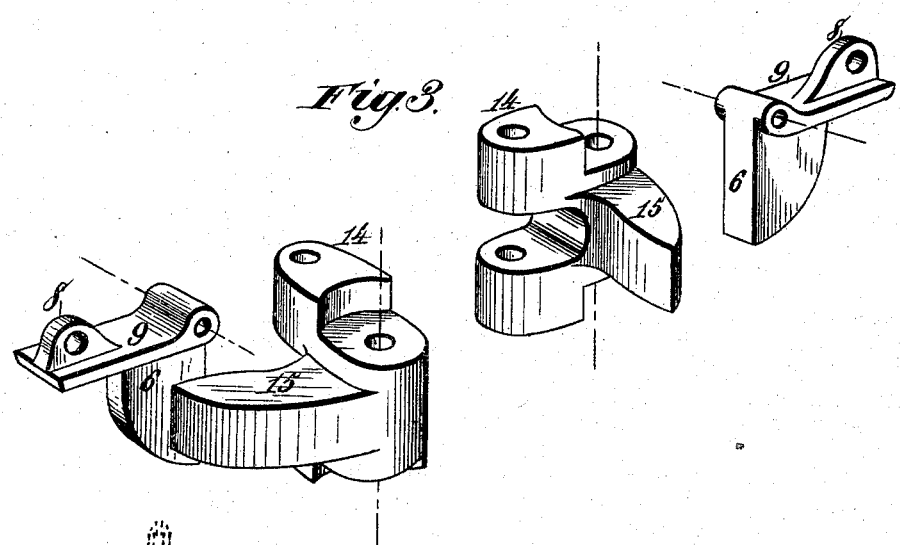
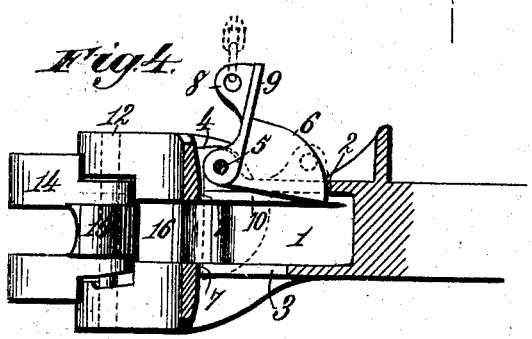
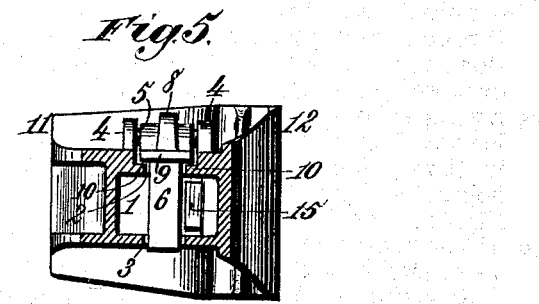
Witnesses.
Inventor:
Cornelius Halpin,
By James L. Norris.
Atty.

UNITED STATES PATENT OFFICE.

CORNELIUS HALPIN, OF NORTH TARRYTOWN, NEW YORK.

CAR-COUPLING.

SPECIFICATION forming part of Letters Patent No. 500,890, dated July 4, 1893.

Application filed March 23, 1893. Serial No. 467,363. (No model.)

*To all whom it may concern:*

Be it known that I, CORNELIUS HALPIN, a citizen of the United States, residing at North Tarrytown, in the county of Westchester and State of New York, have invented new and useful Improvements in Car-Couplings, of which the following is a specification.

This invention relates to that class of car couplings in which each drawhead is provided with a pivotal hooked jaw adapted to be coupled, when in proper position, with the corresponding pivotal hooked jaw of the other drawhead, each pivotal jaw having a tail piece that will press against a locking dog which is pivotally supported above a slotted and recessed portion of the drawhead thereby swinging said dog backward and upward and thus becoming interlocked with one side of the dog in such a manner as to hold the hooked jaws of two adjacent drawheads in secure coupling engagement.

My improvements consist in the construction, combination and relative arrangement of parts in a car coupling having a laterally swinging hooked jaw and a vertically swinging locking dog, as hereinafter described and claimed.

In the annexed drawings illustrating the invention—Figure 1 is a plan of the drawheads coupled. Fig. 2 is a perspective of one drawhead showing its pivotal hooked jaw thrown forward in an open or unlocked position in readiness for coupling with the closed or locked jaw of another drawhead. Fig. 3 is a perspective of the pivotal hooked jaw and locking dogs of two drawheads detached and in their relative positions for coupling, one being locked and the other unlocked or open. Fig. 4 is a vertical longitudinal section of one of the drawheads. Fig. 5 is a vertical transverse section of the same.

Referring to the drawings, it will be seen that each drawhead is recessed or provided with a chamber 1 having a longitudinal slot 2 in its top and a similar slot 3 in its bottom. At the opposite sides of the forward end of the upper slot 2 are lugs or bearings 4 in which is journaled a transversely arranged pivot pin 5 that supports a rearwardly and upwardly swinging locking dog 6, the front portion of which normally rests against vertical abutments 7 at the forward end of the upper and lower slots. It will thus be seen that the dog 6 is pivotally supported at its forward upper corner, above the drawhead in which it normally hangs in a vertical position.

On the upper rear portion of the dog 6 is an eye or perforated lug 8 for attachment of a chain or other flexible connection by means of which the dog can be lifted or swung backward and upward. The rear portion of the dog 6 is preferably curved, as shown, to facilitate its movements in the slotted portions of the drawhead. The dog 6 is provided with parallel vertical sides, as shown, and is of considerably less width than the chamber 1 in which it swings. If desired its top portion may be in the form of a plate 9 projecting on both sides of and in rear of the body of the dog so as to close the upper slot 2 when the dog is lowered, and the sides of the slot may be provided with ledges 10 in which the said plate will seat.

The front of each drawhead is provided with lateral forward projecting horns 11 and 12, one of which, as 11, is short and flared somewhat outward while the other horn 12 is longer and extended more directly forward. In the end of the longer horn 12 is a vertical pivot 13 for supporting a laterally swinging hooked jaw 14 having a tail piece 15 projecting inwardly and substantially at a right angle from the pivotal portion of the jaw. The tail piece 15 is of such length that when swung backward it will extend to and bear against the front of the dog 6 in such a manner as to swing the dog rearward and upward a sufficient distance to permit the tail piece to pass beneath the dog and to one side thereof so as to be locked in a rearwardly extended position when the dog drops back to its place in the drawhead. To facilitate swinging the dog 6 backward the rear face of the tail piece 15 is rounded or beveled, as shown. When the tail piece 15 is extended rearwardly into the drawhead, at one side of the lowered locking dog 6 and in engagement therewith the hooked jaw 14 will project partly across the front of the drawhead and somewhat in advance thereof in position to be brought in contact with the laterally projecting tail 15 on the unlocked and open hooked jaw 14 of the other drawhead. If the opposite drawheads are now brought together the locked jaw 14 of the drawhead will press against the tail piece 15 of the unlocked or opened hook jaw and force the same backward, thereby swinging the unlocked hook jaw of one drawhead into engagement with the locked jaw of the other drawhead and at the same time causing the tail piece 15 of the unlocked jaw to raise the pivoted dog 6 of that drawhead and to pass beneath the same into the drawhead and into locking engagement with the side of the dog which will drop by gravity as soon as relieved from pressure. It will be seen that when the drawheads are thus coupled the horns 11 will prevent sufficient lateral movement to disengage the locked jaw and yet the drawheads will have the requisite play upon each other for turning curves. By raising either locking dog 6, through the chain or flexible connection with the eye or perforated lug 8, the drawheads may be at once uncoupled.

The inner face of the horn 12 on each drawhead may be recessed continuously with the recessed or chambered portion of the drawhead so as to form a seat or housing 16 for the tail piece 15 when it is swung backward into locking engagement with the side of the locking dog.

It will be seen that the straight vertical sides of the pivotally supported and vertically and rearwardly swinging dogs 6 afford firm bearings for the tail pieces 15 when extended rearwardly in locking engagement with said dogs and thus the pivotally supported hooked jaws 14 will be held in firm engagement when coupled.

As adjacent drawheads will not couple with each other unless one of the hooked jaws 14 is left unlocked it is obvious that by locking the hooked jaws on the drawheads of adjacent uncoupled cars, the said cars may be pushed against each other without any liability of becoming coupled automatically, as is often desirable in the yard.

What I claim as my invention is—

In a car-coupling, the combination with a reversed drawhead provided with slots 2 and 3, at its top and bottom, and having abutments 7 at the forward ends of the slots 2 and 3, of bearings 4 at the forward opposite sides of the slot 2, a locking dog 6, having parallel vertical sides pivoted in said bearings and disposed and adapted to swing in the slots 2 and 3, and normally resting by gravity against the abutments 7, a laterally-swinging, pivotally-supported hooked-jaw 14 mounted in front and at one side of the drawhead, and a tail-piece 15, formed with said hooked-jaw and normally projecting across the front of the drawhead in position to be struck by the hooked-jaw on an adjacent, opposite drawhead, said tail-piece raising, and entering at one side of, the pivoted, swinging dog when struck by the hooked-jaw on an adjacent opposite draw-head, and said locking dog dropping by gravity and confining said tail-piece in such position, and means for raising said locking dog out of the way to uncouple, substantially as described.

In testimony whereof I have hereunto set my hand in presence of two subscribing witnesses.

CORNELIUS HALPIN.

Witnesses:
G. W. REA,
A. H. NORRIS.